J. T. ARUNDEL.
ROTARY PLOW.
APPLICATION FILED NOV. 16, 1912.

1,122,461.

Patented Dec. 29, 1914.

WITNESSES.

INVENTOR
J. T. ARUNDEL.

UNITED STATES PATENT OFFICE.

JOHN TEALE ARUNDEL, OF TORONTO, ONTARIO, CANADA.

ROTARY PLOW.

1,122,461.   Specification of Letters Patent.   Patented Dec. 29, 1914.

Application filed November 16, 1912. Serial No. 731,662.

*To all whom it may concern:*

Be it known that I, JOHN TEALE ARUNDEL, of the city of Toronto, in the county of York, in the Province of Ontario, Canada, have invented certain new and useful Improvements in Rotary Plows, of which the following is the specification.

My invention relates to improvements in rotary plows, and the object of the invention is to devise a rotary plow, which may be driven by suitable power so that the virgin soil may be cut up by the plow and left in such a condition as to be ready for immediate seeding and it consists essentially of a main frame, a cross shaft rotatably supported in the frame, rotary plowing members mounted upon the shaft comprising a series of plowshare arms of peculiar form set in a substantially tangential position to the rotary shaft and means for adjusting the vertical position of the shaft in relation to the ground as hereinafter more particularly explained by the following specification.

Figure 1:
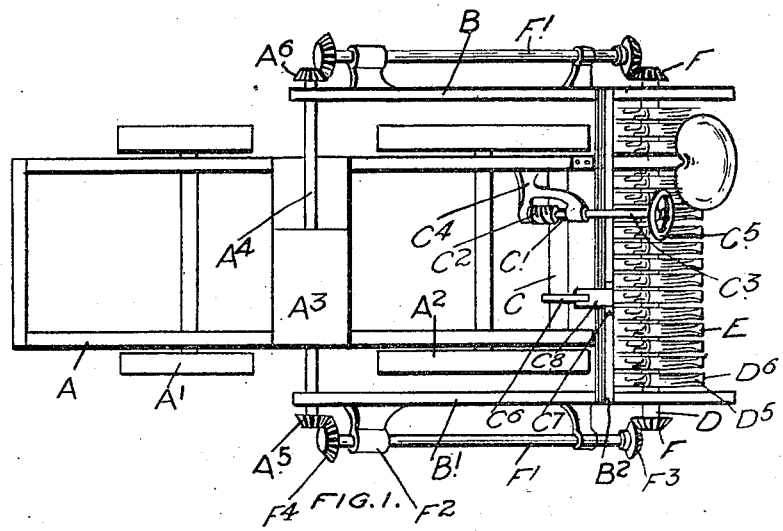
Figure 2:
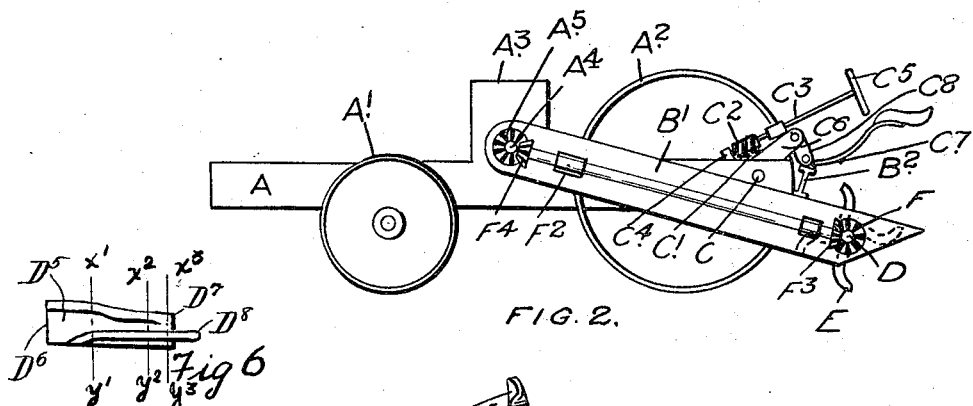
Figure 6:
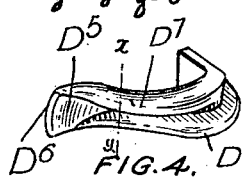
Figures 3, 4, 5:
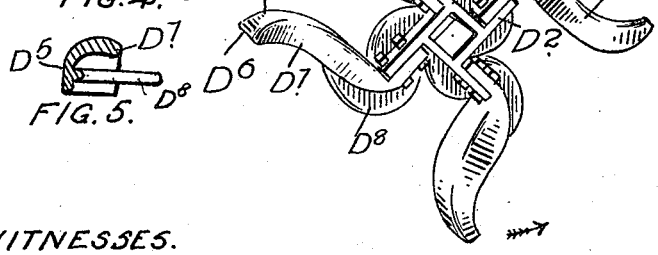
Figure 7:
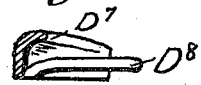
Figure 8:
Figure 9:

Figure 1, is a plan view of my plow. Fig. 2, is a side elevation of Fig. 1. Fig. 3, is an enlarged perspective detail of one of the rotary members. Fig. 4, is an enlarged perspective detail of one of the plowshare arms. Fig. 5, is a cross section on line $x$—$y$ Fig. 4. Fig. 6, is a front elevation of one of the plowshare arms. Fig. 7, is a sectional detail on line $x'$—$y'$ Fig. 6. Fig. 8, is a sectional detail on line $x^2$—$y^2$ Fig. 6. Fig. 9, is a sectional view taken through Fig. 6 on line $x^3$—$y^3$ at the point of junction between the tangential and right angular portions of the plowshare arm body.

In the drawings like letters of reference indicate corresponding parts in each figure.

A is the main frame provided with suitably supporting wheels A' and $A^2$.

$A^3$ is a suitable source of power mounted upon the main frame A and provided with a main driving shaft $A^4$ provided at each end with beveled gears $A^5$ and $A^6$.

B and B' are bars swung at one end upon the driving shaft $A^4$.

$B^2$ is a bar connecting the bars B and B' together in proximity to the free end thereof.

C is a shaft journaled in the side bars of the main frame A. C' is a worm wheel mounted thereon.

$C^2$ is a worm gear mounted upon the shaft $C^3$ journaled in a suitable bracket $C^4$. The shaft $C^3$ is provided with an adjusting handle $C^5$.

$C^6$ is an arm secured to the shaft C.

$C^7$ is a bracket secured to the cross bar $B^2$ and $C^8$ is a link connecting the bracket $C^7$ with the arm $C^6$.

D is a cross shaft journaled in the bars B and B'.

F are beveled gears mounted on each end of the rotary shaft D.

F' are counter shafts mounted in bearings $F^2$ extending from the side bars B and B'.

$F^3$ are beveled gears meshing with the beveled gears F and $F^4$ are beveled gears meshing with the beveled gears $A^5$.

E are a series of rotary members mounted upon the shaft C. The members E comprise a central hub D' (see Fig. 3) and have tangential arms $D^2$ and plowshare arms $D^3$ secured by suitable bolts $D^4$ to the arms $D^2$. Each plowshare arm comprises a body portion, such body portion comprising a portion set in a position parallel with the tangential arms of the hub and through which the bolts $D^4$ extend and a portion $D^5$ extending from the aforesaid portion at its inner end in a direction at right angles to such portion, the portion $D^5$ curving gradually at its outer end to the point $D^6$.

$D^7$ is a flange extending at right angles to the portion $D^5$ and lies throughout its length along one side of the flange $D^5$ and increasing in height from the point $D^6$ toward the hub and then merges into a plane of the portion $D^5$ at the junction between the portion $D^5$ and the tangential portion secured to the portion $D^2$ of the hub.

$D^8$ is a flange which engages in the opposite edge of the portion $D^5$ at a point in the rear of $D^6$, such flange is gradually drawn into the center of $D^5$ and increasing inwardly in height until opposite the point where $D^7$ merges into $D^5$ from which point it gradually decreases in height to the inner end.

It will thus be seen that as the plow passes over the ground the plowshare members are rotated so that the cutting edge $D^6$ engages the ground cutting a portion of earth which passes over the concave side of the horizontal portion $D^5$ between the flanges $D^7$ and $D^8$. As the plowshare arm continues to revolve in the direction of arrow such portion of earth is carried longitudinally of the arm between the flanges $D^7$ and $D^8$, the flange $D^8$ serving to force or crowd the earth toward the flange D⁷ so as to deliver the earth over the side of the arm at the point where the flange D⁷ merges into the portion D⁵ at the inner end of the arm.

To adjust the depth of the cut all that it is necessary to do is to elevate the outer ends of the bars B and B' by means of the handle C⁵, shaft C³, worm C², and worm gear C' mounted upon the shaft C carrying the outer end of the arm C⁶ circumferentially and drawing upon the link C⁸ and bar B² thereby elevating the side bars B and B' and the rotary cutting member carried thereby.

Although I have described this means for elevating the rotary plow members it will, of course, be understood that there are many other ways by which the same result may be accomplished and also that there are many other ways by which the rotary plow members may be rotated other than that shown by the drawing and described herein.

What I particularly wish to cover is the rotary plow members which are revolved as above described slicing the earth up and leaving it behind the plow in a fine almost pulverized condition such as will readily be effected by the action of the atmosphere, the sod being cut up in a fine form which will easily rot and, therefore, obviate the necessity of any further cultivation of the soil before seeding takes place.

What I claim as my invention is:

1. In a rotary plow, the combination with the main frame, of a suitably driven shaft carried by the main frame and rotary plow members carried by the shaft and comprising a central hub and plowshare arms formed by a body portion comprising a tangential portion and a portion extending at right angles to the tangential portion and provided with a side flange merging at each end into the body of the share arm and a flange extending from the opposite side of the right angular portion of the share arm intermediately of its length, such flange being gradually drawn into the center of the body increasing in height merging at its opposite end into the share body, as and for the purpose specified.

2. In a device of the class described, a rotary plowshare member comprising a central hub, a plowshare arm formed by a body portion comprising a portion secured to the hub and extending tangentially therefrom and a portion extending from such tangential portion substantially at right angles thereto, a side flange extending along one side of the right angular portion of the plowshare arm merging at its ends into such arm, and a flange extending from the opposite edge of the right angular portion of the share body intermediately of its length, such flange being gradually drawn into the center of the body and increasing in height and then gradually merging at its opposite end into the share body, as and for the purpose specified.

JOHN TEALE ARUNDEL.

Witnesses:
B. BOYD,
M. EGAN.